Figure 1:
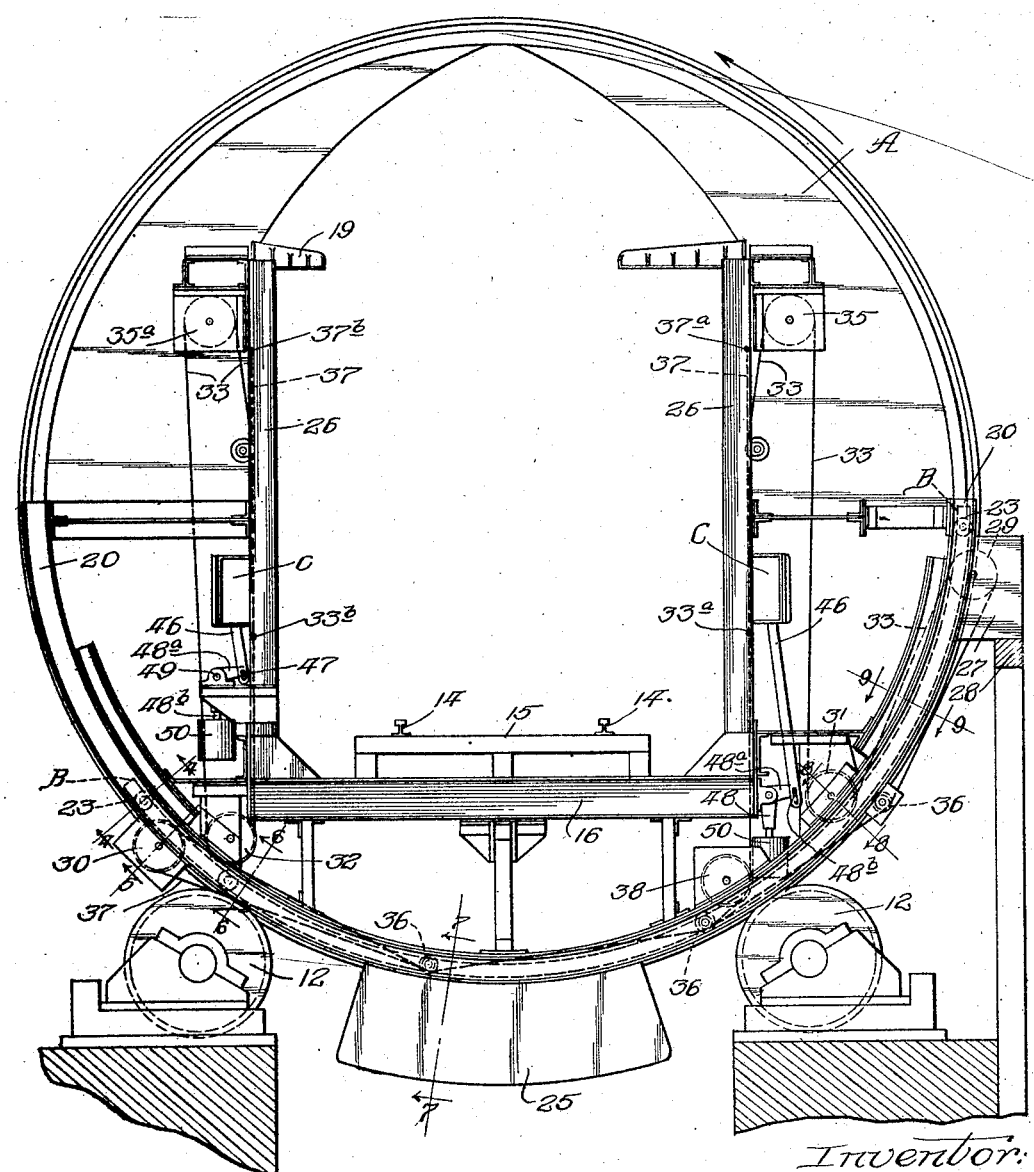

Nov. 9, 1926.

G. N. SIMPSON 1,606,453

CAR HOLDING MECHANISM

Filed Dec. 22, 1924     3 Sheets-Sheet 1

Inventor:
George N. Simpson,
By Dyrenforth, Lee, Chritton & Wiles,
Attys.

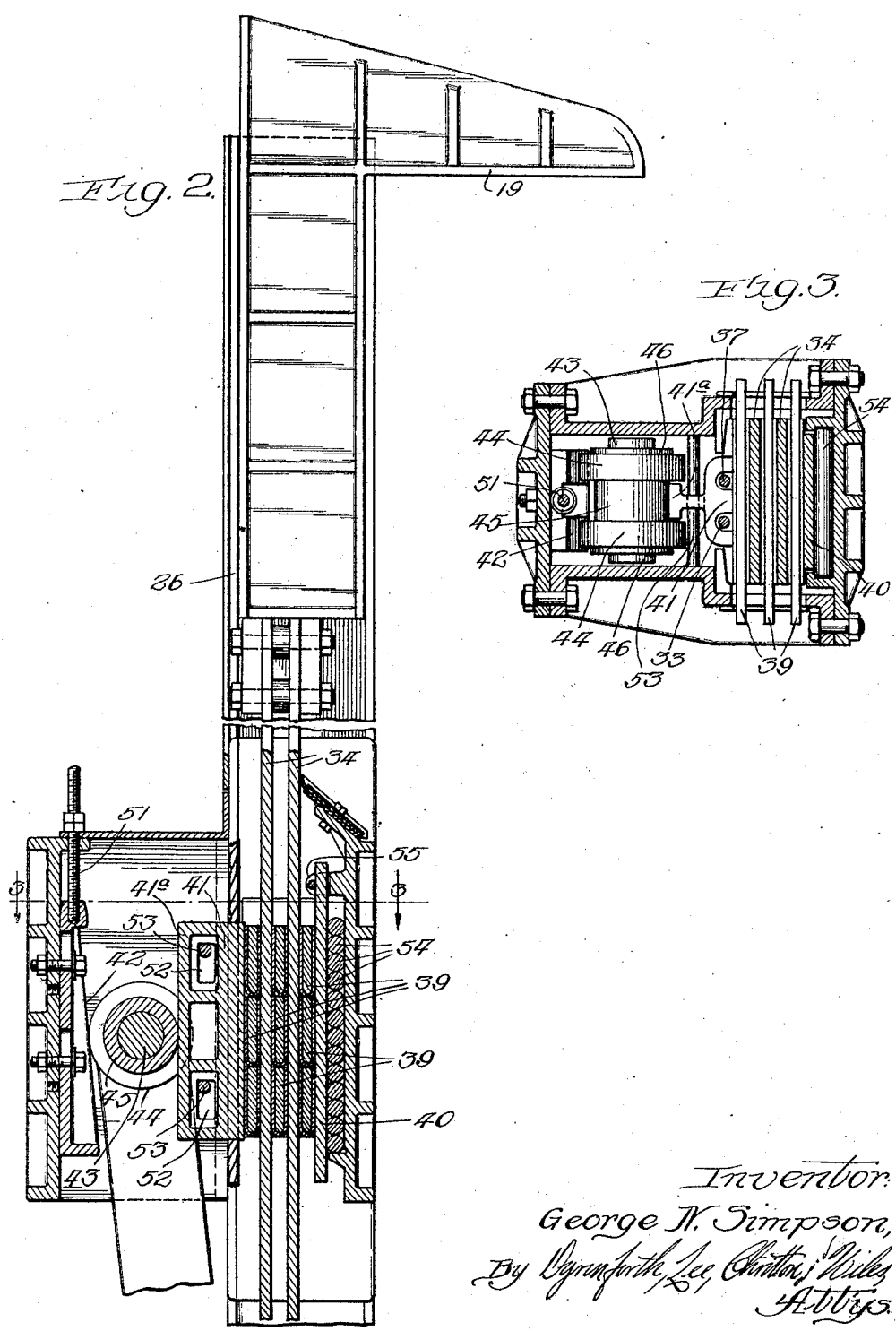

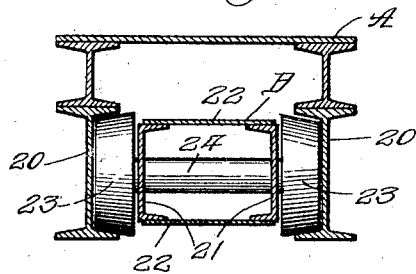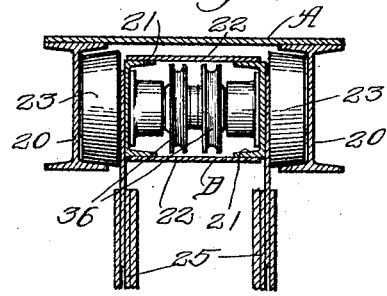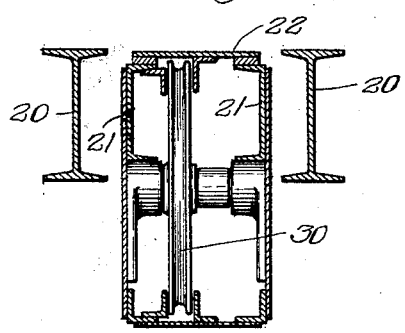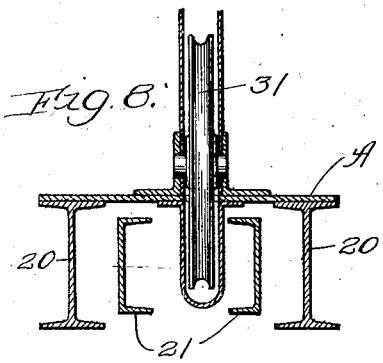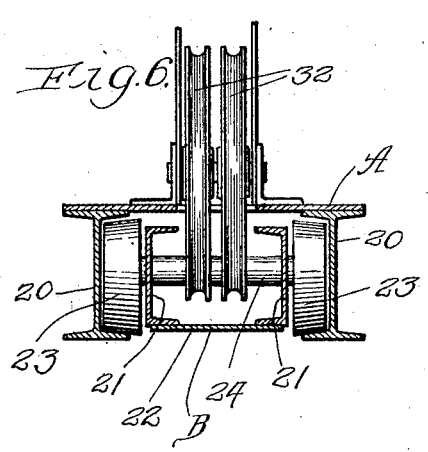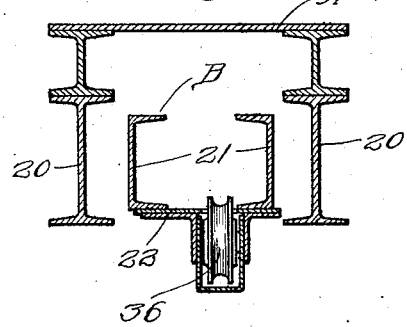

Patented Nov. 9, 1926.

1,606,453

UNITED STATES PATENT OFFICE.

GEORGE N. SIMPSON, OF CHICAGO, ILLINOIS, ASSIGNOR TO CAR-DUMPER & EQUIPMENT COMPANY, OF CHICAGO, ILLINOIS, A CORPORATION OF ILLINOIS.

CAR-HOLDING MECHANISM.

Application filed December 22, 1924. Serial No. 757,426.

This invention relates to improvements in car holding mechanism and is especially adapted for use in connection with any apparatus in which a car of any kind is dumped by causing it to be inverted or partly inverted. It is so designed as to hold a car firmly clamped on the rails during the dumping operation.

I have here shown the invention as adapted for use on a rotary dump comprising a substantially cylindrical cage rotatably mounted and adapted to be rotated to dump a car in position inside of the cage. It is obvious, however, that without detracting from the spirit of my invention, the same mechanism or similar mechanism embodying the principles of my invention may be used in connection with any kind of dumping apparatus to hold a car on the rails during the dumping operation.

The mechanism comprises the use of a plurality of hooks adapted to be lowered to engage the upper edges of the car body and is so designed that substantially the same pressure operates on each hook so that each hook descends until it engages the side of the car or some obstruction so that all the hooks are brought into final engagement whether the sides of the car are of the same height throughout or not. Such lowering of the hooks is accomplished by the use of counterweight frames, one such frame operating to lower two hooks.

The mechanism is also so constructed that when the car dumper reaches substantially the 90° position an adjustable clamp operating weight swings to such a position that the clamp bars attached to the hooks are firmly clamped by clamping means. The hooks are therefore held down, in car holding position, irrespective of whether any of the wire operating ropes should break or not.

The foregoing features and other advantages and objects of my invention will appear more fully and be described more in detail as I proceed with my specification.

In that form of device embodying the features of my invention shown in the accompanying drawings, Figure 1 is a view in end elevation of a car dumper equipped with my improved car holding mechanism, Fig. 2 is a vertical, sectional view showing one of the hooks with the clamp bars and clamping means, Fig. 3 is a view taken as indicated by the line 3 of Fig. 2, Fig. 4 is a view taken as indicated by the line 4 of Fig. 1, Fig. 5 is a view taken as indicated by the line 5 of Fig. 1, Fig. 6 is a view taken as indicated by the line 6 of Fig. 1, Fig. 7 is a view taken as indicated by the line 7 of Fig. 1, Fig. 8 is a view taken as indicated by the line 8 of Fig. 1, and Fig. 9 is a view taken as indicated by the line 9 of Fig. 1.

As shown in the drawings, A indicates, in general, a substantially cylindrical cage rotatably mounted in any suitable manner, for example, on the supporting rollers 12, 12. The cage is formed in any suitable manner and suitably braced and strengthened by struts, braces and framing in any desired manner in order to make a rigid structure. The center of the cage A is sufficiently free from bracing and the like in order to permit a car to enter the cage. Arranged within the cage A are suitable rails 14, 14 forming a track section supported on ties 15 which are supported within the cage in any desired manner, as, for example, on transversely arranged channel members 16. Arranged at one end of the cage, but not shown in the drawings, is a fixed receiving track and at the other end a fixed discharge track lying in alignment with the track 14, when the cage is in its normal upright position. In the operation of the cage, a car is moved from the fixed receiving track into the cage A on the rails 14. The cage is then rotated by any suitable means, thus causing inversion of the car and consequent dumping. The cage is then restored to its normal upright position and the car is moved out of the cage onto the fixed discharge track and carried away. In Fig. 1, the direction of rotation of the cage to cause dumping is indicated by the arrow. The construction of the cage itself, the manner of supporting it, and the manner of rotating it, form no part of the present invention and consequently have not been shown or described in detail. The cage itself may resemble and be supported in the same manner, for example, as the cages shown in United States Letters Patents Numbers 1,508,997, dated September 16, 1924, and 1,465,006, dated August 14, 1923.

It is obvious that in the dumping of a car as described above, means must be provided for holding the car on the rails 14 in its inverted positions. I have provided means for accomplishing this and my invention lies in such means which will be described more in detail hereinafter.

In connection with my car holding mechanism, I provide a plurality of hooks 19, 19 arranged on each side of the interior of the cage A, projecting inwardly above the car body and adapted to be lowered into engagement with the car body to hold the car on the rails 14 when the cage is rotated. These hooks are arranged in pairs, the two hooks of each pair being opposite to each other. There may be as many pairs as desired; and ordinarily should be at least one pair at each end of the car. Since the construction and operation of each pair of hooks is substantially the same, I will describe in detail but one pair, it being understood that there is similar mechanism for each additional pair of hooks that may be used.

In connection with each pair of hooks there is mounted on the under side of the cage A a pair of curved I beams 20, 20 extending substantially 180° around the cage. These I beams are spaced apart so that there will be formed between the same a curved track or guide in which is adapted to slide a curved counterweight frame B. Such counterweight frame is formed of two curved channel irons 21, 21 suitably joined together a short distance apart in any desired manner, as, for example, by the curved plates 22, 22 fastened to their flanges. The curved counterweight frame thus made up is slidably supported between the I beams 20, 20 by means of the rollers 23, 23 mounted on the shafts 24, 24 extending through the channel irons 21, 21. The counterweight frame carries the counterweight 25 as shown, which is substantially in its lowest position when the cage is in its normal upright position with the hooks 19, 19 raised. The counterweight frame B is about 140° long whereas the guide within which it slides is about 180° long. When the cage A is in the normal upright position as shown in Fig. 1, the right hand end of the counterweight frame (as viewed in this figure) is close to the right hand end of the guide 20. It will be seen, therefore, that when the cage A is rotated in the direction indicated by the arrow in Fig. 1, that the counterweight 25 will tend to hold the counterweight frame stationary so that it will slide around in the guide as the cage rotates. That is, in fact, the counterweight frame will remain stationary and the guide will move with the cage, thus effecting a relative sliding movement between the counterweight frame and the guide which is attached to the cage. It is to be understood, therefore, that hereinafter in speaking of the sliding of the frame in the guide, I include any such relative sliding movement.

Each of the hooks 19 is mounted in a suitable vertical guide 26 to permit vertical sliding movement. Upon rotation of the cage to dump a car, the counterweight frame operates to lower the hooks and upon reverse rotation of the cage back to its normal upright position, the counterweight frame operates to raise the hooks. Upon such reverse rotation the lug 27 attached to the counterweight frame engages the stationary stop 28 to prevent the counterweight frame from moving with the cage. There is one rope used for raising the hooks and one for lowering them. The counterweight frame B has attached near one end a sheave 29 and near the other end a sheave 30. The sheave 31 is attached to the cage A and likewise the double sheave 32. 33 indicates a rope adapted to raise the hooks 19. This rope is attached to one of the hooks at 33$^a$, the point of attachment being to the depending flattened clamping bars 34 which will be described more in detail hereinafter. From the point of attachment at 33$^a$, the rope is led upwardly over the sheave 35 mounted near the upper end of the guide 26, thence downwardly around the sheave 31, thence over the sheave 29, thence around over the rollers 36, 36, thence over the double sheave 32, thence over the sheave 35$^a$ near the top of the other guide, and thence attached at its other end to the other hook as indicated by 33$^b$. It will be seen, therefore, that as the cage comes back to its normal upright position and the lug 27 engages the stop 28, that the sheaves 31 and 29 will separate, thus causing a tension on the rope 33 so that its two ends 33$^a$ and 33$^b$ attached to the clamping bars 34 on the hooks 19 will raise the two hooks. The lowering rope is indicated by 37, the same being attached to one of the hooks as indicated at 37$^a$. From this point the rope 37 passes down around the sheave 38, thence over the rollers 36, 36, thence over the sheave 30, thence over the double sheave 32, and thence upwardly where it is attached at 37$^b$ to the other hook. It will be seen, therefore, that upon rotation of the cage A to dump the car, the counterweight 25 on the counterweight frame will tend to hold the frame stationary so that as the cage rotates the sheaves 30 and 32 will separate causing a tension on the rope 37 so that its two ends 37$^a$ and 37$^b$ attached to the two hooks will pull these two hooks downwardly. It will be seen that since there is only one rope pulling down both hooks which rope runs over the sheaves that exactly the same pressure will be brought on each of the two hooks so that each hook will come down positively against the side of the car or else will lower until it reaches some obstruction, therefore bringing both hooks firmly into engagement with the sides of the car whether such sides are of the same height throughout or not. In other words, the sheaves over which the rope 37 passes act as equalizing sheaves.

The counterweight 25 which brings down the hooks needs to be only heavy enough to lower the hooks positively down on top of the car through any material which may be piled up in the car; but such counterweight may be made as strong and heavy as desired. In fact, the counterweight may be heavy enough to hold the car in the car dumper without the use of the clamping arrangement to be hereinafter more particularly described. In such case, such clamping mechanism may be used only for a safety feature. When the hooks reach the limit of their downward movement, it is obvious that through the remaining rotation of the cage, the counterweight 25 on its frame will move with the cage. As has been stated before, upon reverse rotation of the cage to bring the car back to its normal upright position, the counterweight frame and counterweight will move back with the cage until it reaches the position shown in Fig. 1 when the lug 27 on the frame engages the stop 28 to prevent further movement of the counterweight frame and from this point on the sheaves 31 and 29 will separate to cause a pulling on the rope 33 to raise the ends 33ª and 33ᵇ attached to the hooks, thus raising the hooks.

There is also provided means for positively clamping the hooks 19 in their lowered position. I will now describe this clamping means in detail. Depending from each of the hooks 19 is a pair of clamping bars 34. Attached to each of the vertical guides 26 is a clamp, indicated in general by C through which the clamp bars 34 extend. The clamp C is shown best in Figs. 2 and 3. Each clamp comprises a plurality of removable adjustable friction plates 39, 39 arranged in three groups between each pair of which passes one of the clamp bars 34. 40 indicates a back roller pressure plate and 41, a front roller pressure plate. Upon movement of the plates 40 and 41 toward each other it is obvious that the clamp bars 34, 34 will be clamped between the friction plates 39, 39. In front of the front roller pressure plate is mounted a taper pressure plate 42. The front roller pressure plate 41 also carries on its front surface a vertical rail 41ª. Lying between the rail 41ª and the taper pressure plate 42 is a short shaft 43 having mounted thereon a pair of rollers 44, 44 adapted to roll on the taper pressure plate 42. Between the rollers 44, 44 on the same shaft is a smaller roller 45 adapted to roll on the rail 41ª. The shaft 43 is carried on the upper ends of two flat bars 46, 46 which extend downwardly and are pivotally attached at 47 (see Fig. 1) to one arm 48ª of a bell crank 48 pivoted at 49. The other arm 48ᵇ of the bell crank 48 has attached to it a weight 50. When in normal upright position the bell cranks 48, 48 are in the positions shown in Fig. 1 and the weights 50, 50 are hanging down. Upon rotation of the cage to dump a car, the weights 50, 50 will tend to remain in their lower positions with the result that the bell cranks 48, 48 will be rotated on their pivots 49, 49 to pull down the bars 46, 46. It is to be understood that the operation of each of the clamps C is the same. When the bars 46 are pulled down, the shaft 43 will be pulled down causing the rollers 44 to roll on the taper plate 42, thus forcing the roller 45 against the rail 41ª thus moving the plate 41 toward the plate 40 to squeeze the friction plates and clamp the bars 34 to hold the hooks in their lowered positions. The parts are so designed that this clamping of the bars will take place at some point in the rotation of the cage soon after the hooks 19 have been brought down into engagement with the car body by the counterweight 25. The particular point in the rotation when the clamps take hold can be adjusted by moving the taper pressure plate 42 upwardly or downwardly by means of the adjusting screw 51.

The friction plates in the clamp and also the pressure plates can raise approximately an inch and a half without any resistance. It will be noted that there is a certain amount of play between the top of the friction plates in the clamp and the stops. This permits the hooks to rise approximately an inch and a half when the load is removed from the car, in order to take care of the spring expansion on the car without putting any additional strain on the hooks or clamping mechanism, and without putting any additional strain on the sides of the car. This play is permitted by means of the slots 52, 52 formed in the plate 41, upward and downward movement of said plate being limited by the stops 53. The back pressure plate 40 likewise is free to move upwardly and downwardly by rolling on the rollers 54, 54. The plate 40 is provided with a slotted hole through which extends a stop 55 to likewise limit the upward and downward sliding movement of this plate. The plates are normally held down in their lower positions by means of gravity.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A car holding mechanism comprising; a hook adapted to be moved from a raised position above a car body to a lowered position in engagement with a car body; means for moving the hook from its raised position to its lowered position; and means operated by gravity for positively clamping said hook in its lowered position, said means comprising a clamp bar attached to the hook, and a clamp adapted to grip said bar upon the hook reaching its lowered position.

2. A car holding mechanism comprising; a hook adapted to be moved from a raised position above a car body to a lowered position in engagement with a car body; means for moving the hook from its raised position to its lowered position; and means for clamping the hook in its lowered position, said clamping means being slidably mounted, whereby a raising of the hook through a short distance is permitted while said hook is clamped.

3. A car holding mechanism comprising; a hook adapted to be moved from a raised position above a car body to a lowered position in engagement with a car body; a clamp bar depending from said hook; means for moving the hook from its raised position to its lowered position; and clamping means adapted to clamp said clamp bar to hold said hook in its lowered position, said clamping means being slidably mounted whereby a raising of the hook a short distance is permitted while said clamp bar is clamped.

4. A car holding mechanism comprising; a rotatable cage adapted to hold a car to be dumped; a pair of hooks on said cage adapted to be moved from a raised position above a car body in the cage to a lowered position in engagement with said car body; a frame slidably mounted on said cage; a counterweight on said frame, whereby, upon rotation of said cage, said frame will remain stationary and slide on said cage; and a rope joining said hooks and passing over a sheave on the cage and a sheave on the counterweight frame, whereby, upon rotation of said cage with the sliding of the frame thereon, said sheaves will be separated causing a pull on said rope to lower said hooks.

5. A car holding mechanism comprising; a rotatable cage adapted to hold a car to be dumped; a pair of hooks on said cage adapted to be moved from a raised position above a car body in the cage to a lowered position in engagement with said car body; a frame slidably mounted on said cage; a counterweight on said frame, whereby, upon rotation of said cage, said frame will remain stationary and slide on said cage; a rope joining said hooks and passing over a sheave on the cage and a sheave on the counterweight frame, whereby, upon rotation of said cage with the sliding of the frame thereon, said sheaves will be separated causing a pull on said rope to lower said hooks; and means for clamping said hooks in their lowered position.

6. A car holding mechanism comprising; a rotatable cage adapted to hold a car to be dumped; a pair of hooks on said cage adapted to be moved from a raised position above a car body in the cage to a lowered position in engagement with said car body; a frame slidably mounted on said cage; a counterweight on said frame, whereby, upon rotation of said cage, said frame will remain stationary and slide on said cage; a rope joining said hooks and passing over a sheave on the cage and a sheave on the counterweight frame, whereby, upon rotation of said cage with the sliding of the frame thereon, said sheaves will be separated causing a pull on said rope to lower said hooks; and gravity operated means for clamping said hooks in their lowered position.

7. A car holding mechanism comprising; a rotatable cage adapted to hold a car to be dumped; a pair of hooks on said cage adapted to be moved from a raised position above a car body in the cage to a lowered position in engagement with said car body; a frame slidably mounted on said cage; a counterweight on said frame, whereby, upon rotation of said cage, said frame will remain stationary and slide on said cage; and a rope joining said hooks and passing over a sheave on the cage and a sheave on the counterweight frame, whereby, upon rotation of said cage with the sliding of the frame thereon, said sheaves will be separated causing a pull on said rope to lower said hooks, another rope attached to said hooks and passing over a sheave on the cage and a sheave on the counterweight frame whereby sliding movement of said frame on said cage in a reverse direction will cause a pull on said rope to raise said hooks.

8. A car holding mechanism comprising; a rotatable cage adapted to hold a car to be dumped; a pair of hooks on said cage adapted to be moved from a raised position above a car body in the cage to a lowered position in engagement with said car body; a frame slidably mounted on said cage; a counterweight on said frame, whereby, upon rotation of said cage, said frame will remain stationary and slide on said cage; a rope joining said hooks and passing over a sheave on the cage and a sheave on the counterweight frame, whereby, upon rotation of said cage with the sliding of the frame thereon, said sheaves will be separated causing a pull on said rope to lower said hooks, another rope attached to said hooks and passing over a sheave on the cage and a sheave on the counterweight frame whereby sliding movement of said frame on said cage in a reverse direction will cause a pull on said rope to raise said hooks; and a lug on said counterweight frame adapted to be engaged by a stop adjacent the cage upon reverse rotation of said cage to cause said reverse sliding movement of said counterweight frame on said cage to raise said hooks.

9. A car holding mechanism comprising; a hook adapted to be moved from a raised position above a car body to a lowered position in engagement with a car body; a clamp bar depending from said hook; means for moving the hook from its raised position to its lowered position; and means for positively clamping said hook in its lowered position, said clamping means including a pair of friction plates with the clamp bar extending therebetween, a flat pressure plate and a taper pressure plate with an anti-friction member arranged therebetween, whereby movement of said anti-friction member causes a separation of said pressure plates and a pressing together of said friction plates to clamp the clamp bar therebetween.

10. A car holding mechanism comprising; a hook adapted to be moved from a raised position above a car body to a lowered position in engagement with a car body; a clamp bar depending from said hook; means for moving the hook from its raised position to its lowered position; means for positively clamping said hook in its lowered position, said clamping means including a pair of friction plates with the clamp bar extending therebetween, a flat pressure plate and a taper pressure plate with an anti-friction member arranged therebetween, whereby movement of said anti-friction member causes a separation of said pressure plates and a pressing together of said friction plates to clamp the clamp bar therebetween; and a bell crank, having one arm connected to said anti-friction member and a weight on the other arm, whereby upon rotation of said clamping means said weight operating said bell crank will cause a movement of said anti-friction member between said pressure plates.

11. A car holding mechanism comprising; a hook adapted to be moved from a raised position above a car body to a lowered position in engagement with a car body; a clamp bar depending from said hook; means for moving the hook from its raised position to its lowered position; and means for positively clamping said hook in its lowered position, said clamping means including a pair of friction plates with the clamp bar extending therebetween, a flat pressure plate and a slidably adjustable taper pressure plate with an anti-friction member arranged therebetween, whereby movement of said anti-friction member causes a separation of said pressure plates and a pressing together of said friction plates to clamp the clamp bar therebetween.

12. A car holding mechanism comprising; a hook adapted to be moved from a raised position above a car body to a lowered position in engagement with a car body; a clamp bar depending from said hook; means for moving the hook from its raised position to its lowered position; and means for positively clamping said hook in its lowered position, said clamping means including a pair of friction plates with the clamp bar extending therebetween, a slidably movable flat pressure plate and a slidably adjustable taper pressure plate with an anti-friction member arranged therebetween, whereby movement of said anti-friction member causes a separation of said pressure plates and a pressing together of said friction plates to clamp the clamp bar therebetween.

Witness my hand and seal this 29 day of November, A. D. 1924.

GEORGE N. SIMPSON. [L. S.]